United States Patent [19]

Kupka et al.

[11] Patent Number: 4,662,979

[45] Date of Patent: May 5, 1987

[54] GLUING APPARATUS

[75] Inventors: Gerhard Kupka; Hans Müller, both of Lauda-Königshofen, Fed. Rep. of Germany

[73] Assignee: Vereinigte Buchbindereimaschinenfabriken Gesellschaft mit beschränkter Haftung, Lauda-Königshofen, Fed. Rep. of Germany

[21] Appl. No.: 838,925

[22] Filed: Mar. 12, 1986

[30] Foreign Application Priority Data

Mar. 14, 1985 [DE] Fed. Rep. of Germany ... 8507513[U]

[51] Int. Cl.[4] .............................................. B32B 31/00

[52] U.S. Cl. .................................... 156/578; 118/216; 156/908; 412/19; 412/37

[58] Field of Search .................. 156/578, 908; 412/37, 412/19–21; 118/216, 217, 212

[56] References Cited

U.S. PATENT DOCUMENTS

| | | | |
|---|---|---|---|
| 2,632,918 | 3/1953 | Bergstein | 118/216 X |
| 2,820,230 | 1/1958 | Maloney et al. | 412/19 |
| 3,117,890 | 1/1964 | Atkins et al. | 118/212 |
| 3,991,708 | 11/1976 | Huebschmann | 118/212 X |

*Primary Examiner*—David Simmons
*Attorney, Agent, or Firm*—Toren, McGeady and Goldberg

[57] ABSTRACT

The invention relates to a gluing apparatus which can be used in particular as part of a book casing-in machine. The gluing apparatus includes an application roller for applying a glue layer to a surface to be glued and a dosing roller for dosing the amount of glue. The application roller comprises an axis-parallel depression and the dosing roller comprises an axis-parallel projection engaging in the depression. The profile of the projection (20) of the dosing roller (2) merges from the cylindrical peripheral surface (4) via an involute into a coaxial cylindrical portion (22) of greater diameter while the profile of the depression (10) of the application roller (1) merges from the cylindrical peripheral surface (3) via a curve forming the counter profile to the involute of the projection (20) into a coaxial cylindrical portion (12) of smaller diameter. The configuration of the profiles of the application roller and the dosing roller according to the invention permit simple and economic production of the rollers and ensures that the glue bead can escape upwardly out of the roller gap unrestricted and without any danger of inclusions.

10 Claims, 2 Drawing Figures

GLUING APPARATUS

The invention relates to a gluing apparatus in particular for inner books to be cased in book cases in casing-in machines, comprising an application roller associated with a surface area to be glued, rolling on the latter and thereby leaving behind a glue layer and a dosing roller which is associated with said application roller and has an opposite direction of rotation, and for the fold gluing the application roller is provided with an axis-parallel depression and the dosing roller with an axis-parallel projection engaging in said depression.

In such gluing apparatuses the application roller serves to provide the surface area of the inner book to be glued with the necessary glue application and the dosing roller imparts to the application roller the correct uniform glue coating, for example from a glue bead present in the roller wedge. The axis-parallel depression of the application roller receives the projecting fold of the inner book and ensures the correct gluing thereof. The projection of the dosing roller emerges on passage through the joint rolling zone into the depression in order firstly to ensure the closure in this region and secondly to ensure the correct glue coating in the depression.

For the correct functioning of the gluing apparatus in particular the cooperating profiles of the depression of the application roller and the projection of the dosing roller are important. These profiles must be made such that on interengaging in the rolling zone they maintain the correct closure of the roller wedge which permits the unrestricted escape of the glue bead disposed between the rollers without any danger of inclusions, and ensure the correct glue application on the active faces of the depression. Hitherto, these various requirements could be met only with relatively complicated profiles which were difficult to make.

The problem underlying the invention is the provision of a gluing apparatus of the type set forth at the beginning in which the requirements indicated are optimally met with a simple profile form of the rollers which is easy to make.

According to the invention this problem is solved in that the profile of the projection at the entry portion lying at the front in the direction of rotation merges via an involute from the cylindrical peripheral surface of the dosing roller into a coaxial cylindrical portion of greater diameter and that the profile of the depression at the entry portion lying at the front in the direction of rotation merges via a curve forming the counter profile to the involute of the projection from the cylindrical peripheral surface of the application roller into a coaxial cylindrical portion of smaller diameter.

According to a preferred embodiment of the invention the curve forming the profile of the entry portion of the depression is an involute forming the counter profile to the involute of the projection. In this case the involutes of the projection and the depression are preferably formed with an engagement angle of 45°.

A further advantageous development of the gluing apparatus according to the invention resides in that the profile of the projection merges at the exit portion lying behind in the direction of rotation via an eccentric cylindrical portion of smaller diameter from the coaxial cylindrical portion into the cylindrical peripheral surface of the dosing roller and that the transition of the depression from the coaxial cylindrical portion of small diameter to the cylindrical peripheral surface of the application roller in the exit portion is formed as counter profile to the eccentric cylindrical exit portion of the projection.

Due to the configuration of the profiles of the depression of the application roller and the projection of the dosing roller when the projection enters into the depression due to the rolling of the involute flank on the matching counter profile the glue bead can escape upwardly unrestricted without any danger of inclusions. During the entire passage through the rolling zone the reliable closure of the roller wedge is ensured. Furthermore, the matched profiles of the projection and depression ensure the proper glue application in particular on the surface portion of the depression effective for the gluing of the fold.

A particular advantage of the profile configuration according to the invention is the favourable manufacturability because of the simple geometry because the profiles are made up essentially only of circles and involutes which can be easily designed and mechanically made without any problems.

Further features and advantages will be apparent from the following description of an example of embodiment illustrated in the drawings, wherein:

FIG. 1 shows diagrammatically in side view the one gluing mechanism of a gluing apparatus for a book casing-in machine. The gluing mechanism consists essentially of an application roller 1 and a dosing roller 2 whose peripheral profiles can be seen in the drawing.

Figure 1:
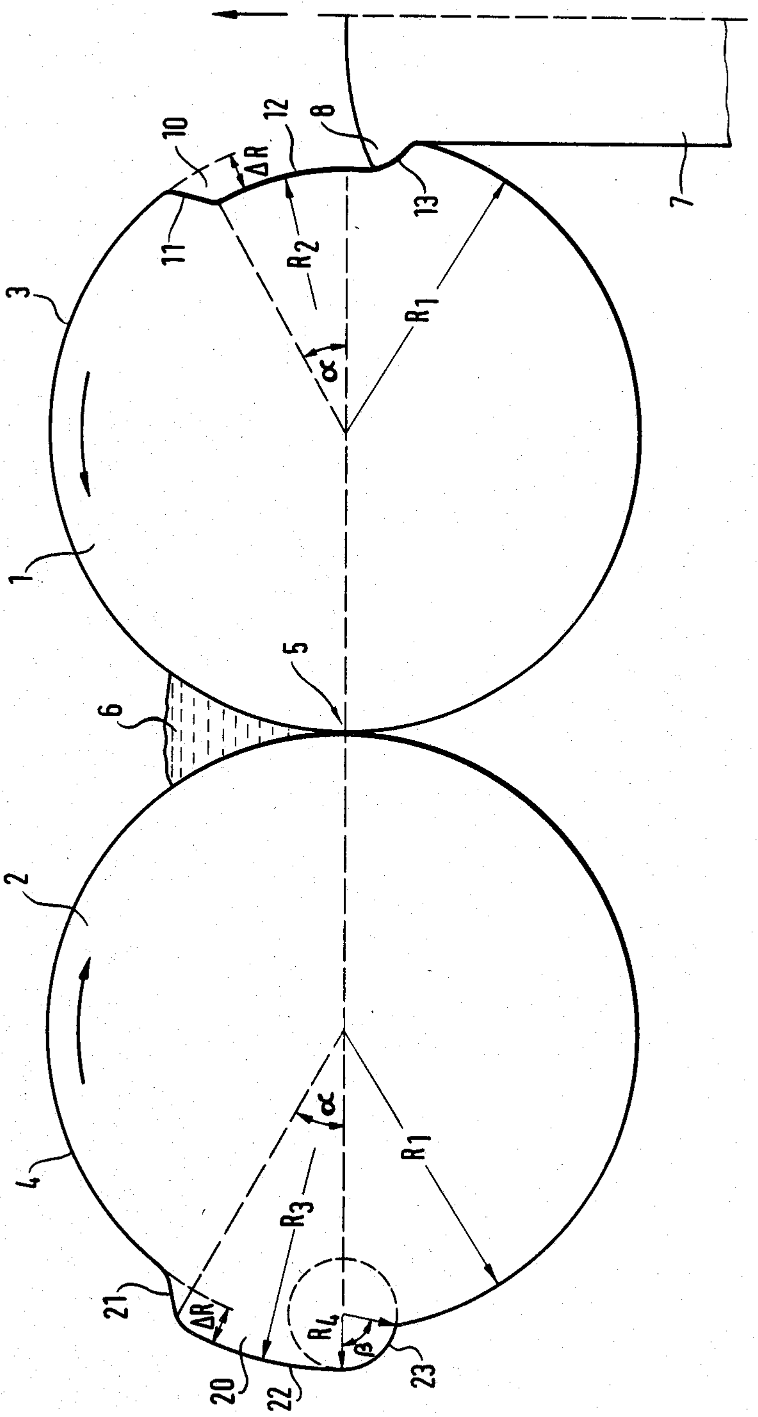
FIG. 1 is a schematic side view of a gluing mechanism of a gluing apparatus according to the invention and FIG. 2 shows the gluing mechanism of FIG. 1 with the rollers in another position.

The application roller 1 comprises over the greater part of its periphery a cylindrical peripheral surface 3 having the radius $R_1$ and the dosing roller 2 is formed in corresponding manner over the major part of its periphery with a cylindrical peripheral surface 4 having preferably the same radius $R_1$. The axes of the two rollers lie in a common horizontal diameter plane, the axis spacing being substantially equal to the sum of the two radii $R_1$ so that the rollers 1 and 2 are completely or almost tangential in a rolling zone 5. A glue supply means not illustrated ensures a constant amount of glue 6 in the wedge of the two rollers 1 and 2.

The two rollers 1 and 2 are driven in opposite senses in the direction of the arrows so that their peripheral surfaces pass through the rolling zone 5 from the top to the bottom. The dosing roller 2 ensures that the surface of the application roller 1 entrains a glue coating of predetermined thickness. The glue coating thickness can be defined by the axis spacing of the two rollers and/or by depressions in the surface of the application roller 1.

The application roller 1 transfers the entrained glue coating to the one side of an inner book 7 which at the point substantially diametrically opposite the rolling zone 5 is moved in contact with the application roller 1 from the bottom to the top. For the gluing of the other side of the inner block the gluing apparatus comprises a second gluing mechanism which is arranged laterally inverted with respect to the gluing mechanism illustrated but which for simplification has not been shown.

Figure 2:
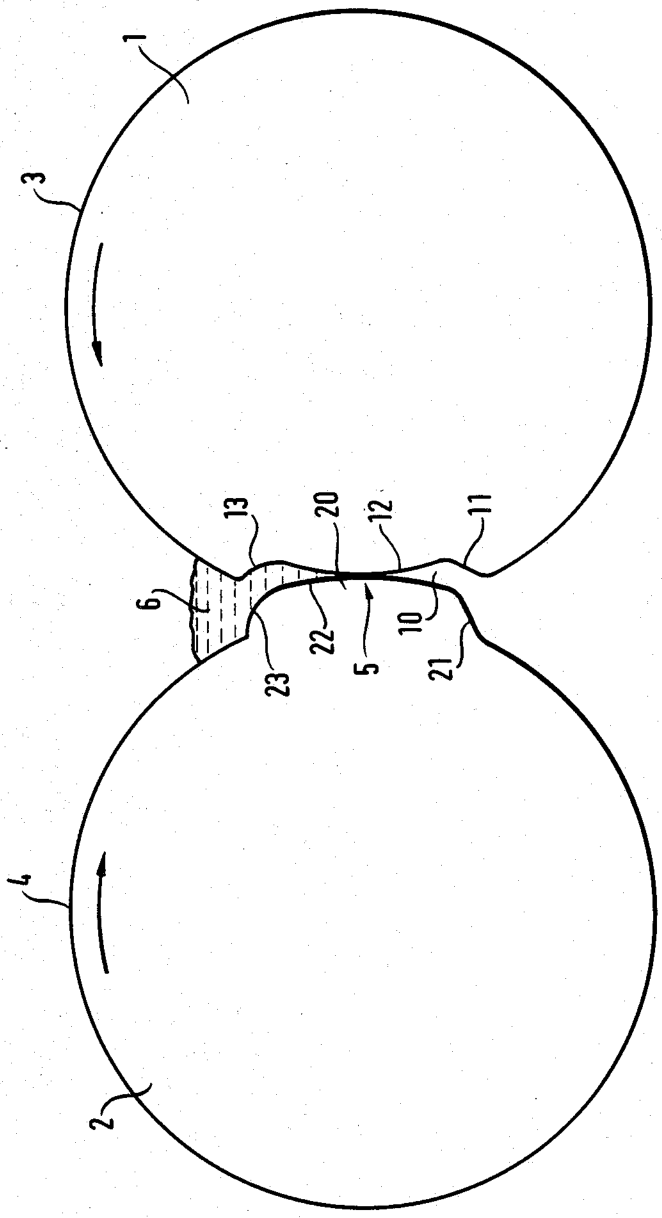

To ensure that the correct gluing of the fold 8 of the book 7 is achieved the application roller is provided with a depression 10 which is deep enough to be able to receive the fold 8 of the inner book 7. On the dosing roller 2 a projection 20 complementary to the depression 10 is formed which on rotation of the rollers penetrates into the depression 10 when the latter runs through the rolling zone 5 (FIG. 2). The projection 20 ensures that on this passage through the rolling zone the amount of glue 6 disposed in the roller wedge is retained and the surfaces of the depression 10 receive the glue coating necessary for proper gluing of the fold 8. The profiles of the depression 10 and the projection 20 are important for this purpose.

The depression 10 and the projection 20 extend parallel to the axes of the rollers 1 and 2, i.e. perpendicular to the plane of the drawing of FIG. 1, with constant profile as will be explained hereinafter with the aid of FIG. 1.

The profile of the depression 10 consists of three portions, that is the entry portion 11 leading in the direction of rotation, the centre portion 12 forming the lowermost point and the exit portion 13 trailing in the direction of rotation. In corresponding manner the profile of the projection 20 consists of three portions, i.e. the entry portion 21 leading in the direction of rotation, the centre portion 22 forming the greatest protuberance and the exit portion 23 trailing in the direction of rotation. The centre portion 12 which occupies the greater part of the angular extent of the depression 10 is formed by a cylindrical surface which is coaxial with the peripheral surface 3 of the application roller 1 and the radius $R_2$ of which is smaller than the radius $R_1$ of the peripheral surface 3. The depth of the depression 10 is given by the radius difference $\Delta R = R_1 - R_2$. The angular extent $\alpha$ of the cylindrical centre portion 12 may be about 30°.

In complementary manner the centre portion 22 of the projection 20 is formed by a cylindrical surface which is coaxial with the peripheral surface 4 of the dosing roller 2 and the radius $R_3$ of which is greater by the radius difference $\Delta R$ than the radius $R_1$ of the peripheral surface 4. The centre portion 22 has the same angular extent $\alpha$ as the centre portion 12 of the depression 10. Thus, the centre portions 12 and 22 are tangent to each other on passage through the rolling zone 5 (FIG. 2) in the same manner as the peripheral surfaces 3 and 4 of the two rollers.

The entry portion 11 of the depression 10 forms the transition from the cylindrical peripheral surface 3 to the cylindrical centre portion 12 and in corresponding manner the entry portion 21 of the projection 20 forms the transition from the cylindrical peripheral surface 4 to the cylindrical centre portion 22. The profiles of these transitions are important in order to ensure on entry of the projection 20 into the depression 10 the correct closure in the rolling zone 5 and also that the glue bead which has previously penetrated into the depression 10 can escape upwardly unrestricted without undesirable inclusions.

An important feature of the profile form shown resides in that the profile of the entry portion 21 of the projection 20 is formed by an involute so that the front flank of the projection 20 forming the entry portion 21 corresponds to the tooth flank of an involute toothing. The profile of the entry portion 11 of the depression 10 forms the necessary counter profile to the involute flank of the projection 20. Preferably this counter profile is also formed by an involute so that the two entry profiles cooperate like the tooth flanks of an involute toothing and on entry of the projection 20 into the depression 10 roll on each other in accordance with the laws governing tooth engagement. These are of course circular involutes, the radius of the base circle of the involute being less than the radius $R_1$ of the rollers. Preferably, the involute flanks of the entry portions 11 and 21 are formed with an engagement angle of 45°. By this profile form the optimum conditions are obtained on entry of the projection 20 into the depression 10. Furthermore, the involute flanks 11 and 21 can be designed and made by the known gear toothing techniques in simple manner.

The exit portion 13 of the depression 10 forms the transition from the recessed cylindrical centre portion 12 to the cylindrical peripheral surface 3 and it is the portion of the depression 10 which is effective in the gluing of the fold 8. The exit portion 23 of the projection 20 forms in corresponding manner the transition from the cylindrical centre portion 22 to the cylindrical peripheral surface 4 and it cooperates on exit of the projetion 20 from the depression 10 with the exit portion 13 of the depression 10 to obtain the correct glue application. It has been found that particularly good results can be obtained in the exit region when the profile of the exit portion 23 of the projection 20 is formed by a cylindrical surface portion whose radius $R_4$ is substantially smaller than the radius $R_1$ of the peripheral surface 4 and whose axis lies eccentrically with respect to the axis of the dosing roller 2. The cylindrical exit portion 23 with the radius $R_4$ adjoins the cylindrical centre portion 22 with the radius $R_3$ tangentially and extends over a centre angle $\beta$ which is greater than 60° and less than 90°.

The profile of the exit portion 13 of the depression 10 is formed as counter profile to the profile of the cylindrical exit portion 23 of the projection 20 so that on passage through the rolling zone 5 (FIG. 4) the profiles roll on each other and thus ensure the necessary closure and that the proper glue application is obtained. The resulting profile form of the exit portion 13 also gives the proper gluing of the fold 8.

We claim:

1. Gluing apparatus in particular for inner books to be cased in book cases in casing-in machines, comprising an application roller associated with a surface area to be glued, rolling on the latter and thereby leaving behind a glue layer and a dosing roller which is associated with said application roller and has an opposite direction of rotation, and for the fold gluing the application roller is provided with an axis-parallel depression and the dosing roller with an axis-parallel projection engaging in said depression, characterized in that the profile of the projection (20) at the entry portion (21) lying at the front in the direction of rotation merges via an involute from the cylindrical peripheral surface (4) of the dosing roller (2) into a coaxial cylindrical portion (22) of greater diameter and that the profile of the depression (10) at the entry portion (11) lying at the front in the direction of rotation merges via a curve forming the counter profile to the involute of the projection (20) from the cylindrical peripheral surface (3) of the application roller (1) into a coaxial cylindrical portion (12) of smaller diameter.

2. Gluing apparatus according to claim 1, characterized in that the curve forming the profile of the entry portion (11) of the depression (10) is an involute forming the counter profile to the involute of the projection (20).

3. Gluing apparatus according to claim 1, characterized in that the curve forming the profile of the entry portion (11) of the depression (10) is an involute forming the counter profile to the involute of the projection (20) and in that the involutes of the projection (20) and the depression (10) are formed with an engagement angle of 45°.

4. Gluing apparatus according to claim 1, characterized in that the profile of the projection (20) merges at the exit portion (23) lying behind in the direction of rotation via an eccentric cylindrical portion of smaller diameter from the coaxial cylindrical portion (22) into the cylindrical peripheral surface (4) of the dosing roller (2) and that the transition of the depression (10) from the coaxial cylindrical portion (12) of smaller diameter to the cylindrical peripheral surface (3) of the application roller (1) in the exit portion (13) is formed as counter profile to the eccentric cylindrical exit portion (23) of the projection (20).

5. Gluing apparatus according to claim 1, characterized in that the curve forming the profile of the entry portion (11) of the depression (10) is an involute forming the counter profile to the involute of the projection (20) and in that the profile of the projection (20) merges at the exit portion (23) lying behind in the direction of rotation via an eccentric cylindrical portion of smaller diameter from the coaxial cylindrical portion (22) into the cylindrical peripheral surface (4) of the dosing roller (2) and that the transition of the depression (10) from the coaxial cylindrical portion (12) of smaller diameter to the cylindrical peripheral surface (3) of the application roller (1) in the exit portion (13) is formed as counter profile to the eccentric cylindrical exit portion (23) of the projection (20).

6. Gluing apparatus according to claim 1, characterized in that the curve forming the profile of the entry portion (11) of the depression (10) is an involute forming the counter profile to the involute of the projection (20), that the involutes of the projection (20) and the depression (10) are formed with an engagement angle of 45°, and in that the profile of the projection (20) merges at the exit portion (23) lying behind in the direction of rotation via an eccentric cylindrical portion of smaller diameter from the coaxial cylindrical portion (22) into the cylindrical peripheral surface (4) of the dosing roller (2) and that the transition of the depression (10) from the coaxial cylindrical portion (12) of smaller diameter to the cylindrical peripheral surface (3) of the application roller (1) in the exit portion (13) is formed as counter profile to the eccentric cylindrical exit portion (23) of the projection (20).

7. Gluing apparatus according to claim 1, characterized in that the coaxial cylindrical portions (12, 22) of the depression (10) and the projection (20) extend over an angle $\alpha$ of about 30°.

8. Gluing apparatus according to claim 1, characterized in that the curve forming the profile of the entry portion (11) of the depression (10) is an involute forming the counter profile to the involute of the projection (20) and in that the coaxial cylindrical portions (12, 22) of the depression (10) and the projection (20) extend over an angle $\alpha$ of about 30°.

9. Gluing apparatus according to claim 1, characterized in that the curve forming the profile of the entry portion (11) of the depression (10) is an involute forming the counter profile to the involute of the projection (20), that the involutes of the projection (20) and the depression (10) are formed with an engagement angle of 45°, and in that the coaxial cylindrical portions (12, 22) of the depression (10) and the projection (20) extend over an angle $\alpha$ of about 30°.

10. Gluing apparatus according to claim 1 wherein the curve forming the profile of the entry portion (11) of the depression (10) is an involute forming the counter profile to the involute of the projection (20), wherein the involutes of the projection (20) and the depression (10) are formed with an engagement angle of 45°, wherein the profile of the projection (20) merges at the exit portion (23) lying behind in the direction of rotation via an eccentric cylindrical portion of smaller diameter from the coaxial cylindrical portion (22) into the cylindrical peripheral surface (4) of the dosing roller (2) and wherein the transition of the depression (10) from the coaxial cylindrical portion (12) of smaller diameter to the cylindrical peripheral surface (3) of the application roller (1) in the exit portion (13) is formed as counter profile to the eccentric cylindrical exit portion (23) of the projection (20), and wherein the coaxial cylindrical portions (12, 22) of the depression (10) and the projection (20) extend over an angle $\alpha$ of about 30°.

* * * * *